UNITED STATES PATENT OFFICE.

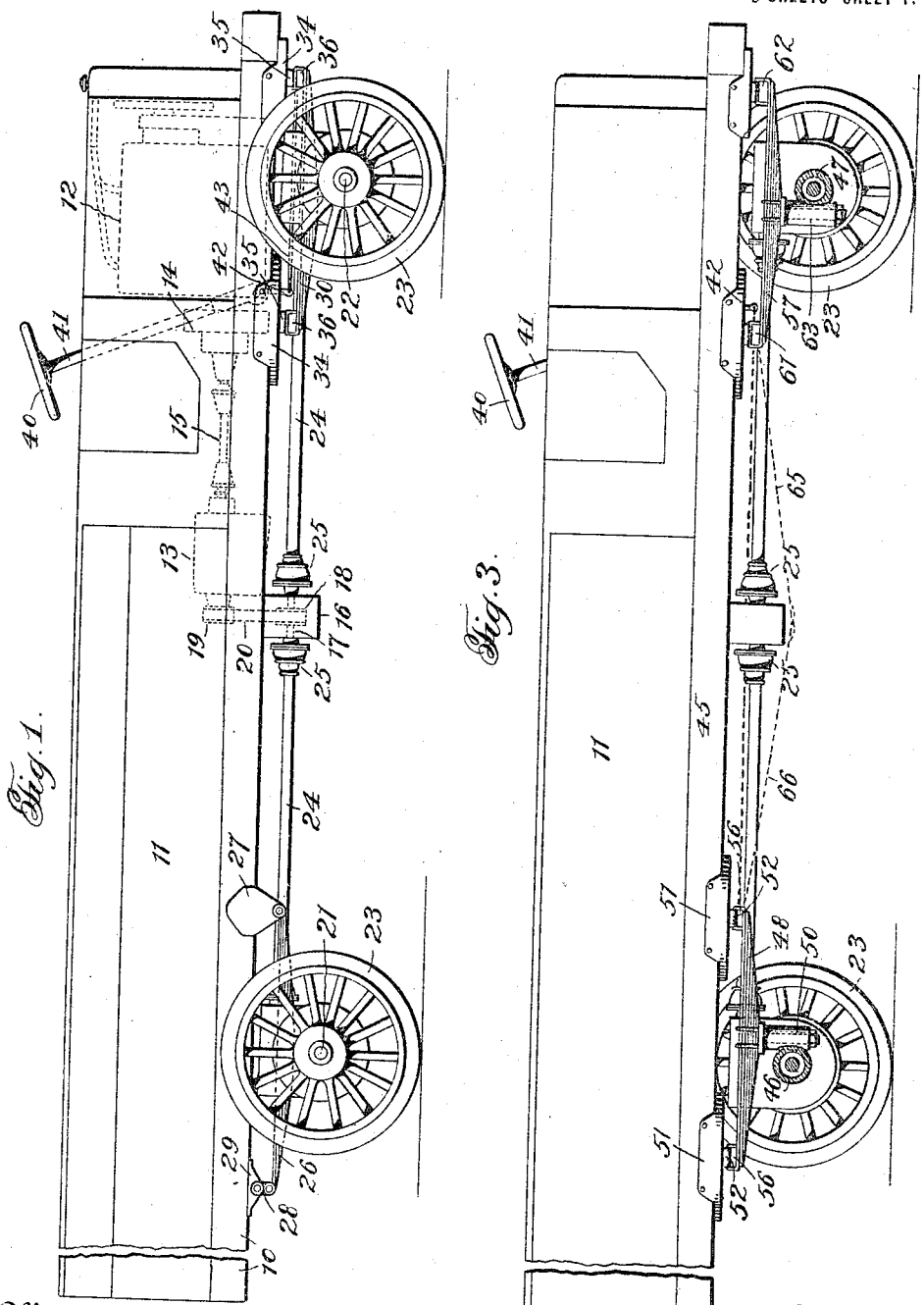

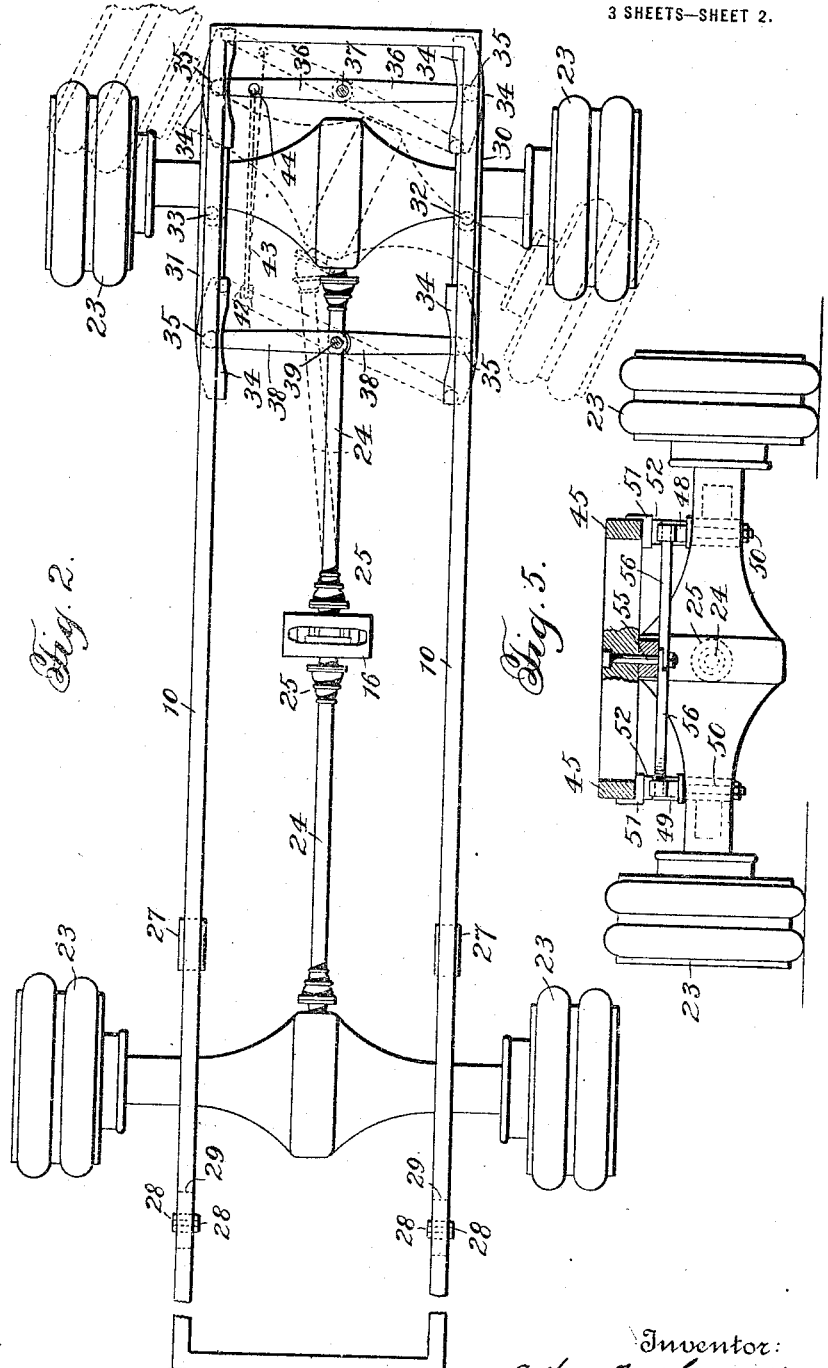

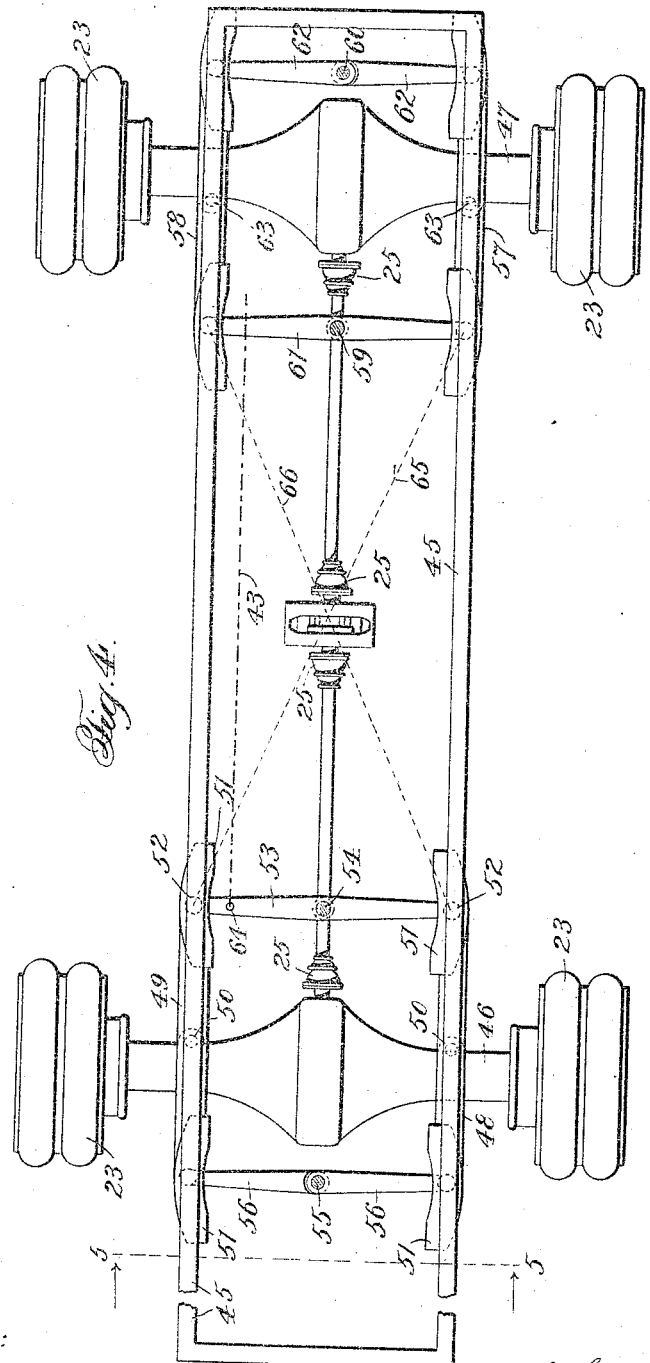

ARTHUR M. LAYCOCK, OF WILKES-BARRE, PENNSYLVANIA.

VEHICLE.

1,229,296.

Specification of Letters Patent.

Patented June 12, 1917.

Application filed July 7, 1915. Serial No. 38,484.

*To all whom it may concern:*

Be it known that I, ARTHUR M. LAYCOCK, subject of the King of Great Britain, and resident of Wilkes-Barre, county of Luzerne, State of Pennsylvania, have invented certain new and useful Improvements in Vehicles, of which the following is a specification.

This invention relates to vehicles and more particularly to motor vehicles of the four-wheel-drive type in which either two or four of the wheels are also used for steering purposes.

The objects of the invention are to provide a vehicle of the type referred to which shall be capable of transporting heavy loads and in which the body frame is flexibly supported and the steering is effected by swinging one or more of the axles bodily, thereby avoiding the usual pivots which, in the vehicles now commonly in use, connect the spindles of the steering wheels with the stationary axles.

Other objects and the features of novelty will be apparent from the following description taken in connection with the accompanying drawings, in which:

Figure 1 is a side elevation of a four-wheel-drive vehicle embodying my invention, one of the axles being arranged to swing for the purpose of steering the vehicle.

Fig. 2 is a plan view of the vehicle shown in Fig. 1.

Fig. 3 is a side elevation of another form of my invention in which both of the axles are arranged to swing for the purpose of steering the vehicle.

Fig. 4 is a plan view of the vehicle shown in Fig. 3.

Fig. 5 is a transverse section on the line 5—5 of Fig. 4.

Referring to Figs. 1 and 2, 10 indicates the body frame which carries a body 11 of any desired form. A motor is indicated diagrammatically at 12 and this motor is operatively connected with the usual transmission gearing in a gear box 13, by means of a clutch 14 and a universally jointed shaft 15. Arranged below the frame 10 is a casing 16 in which there is journaled a shaft 17 carrying a sprocket 18 which is operatively connected with a sprocket 19 by means of a chain 20. The parts just described are only shown diagrammatically because their design and arrangement is largely a matter of choice and form no part of the present invention. The casing 16 is preferably arranged at a point substantially midway between the axles 21 and 22. The axles 21 and 22 have rotatably mounted on the ends thereof the road wheels 23 and these wheels are driven by means of any suitable form of transmission mechanism carried by the axles. These transmission mechanisms usually include shafts extending longitudinally of the axles and connected with the wheels and also with differential mechanism arranged at the middle of the axles, the differential mechanism being driven by means of bevel or worm gears from propeller shafts 24 which are operatively connected with the motor and, in the form of the invention illustrated, are operatively connected with the shaft 17. The shafts 24 are preferably of the usual telescopic construction and each includes a pair of universal joints 25 so that the axles will be free to move relatively to the vehicle frame without disturbing the driving relation between the transmission mechanism on the frame and the transmission mechanisms in the axles.

The rear axle, in the form of the invention shown in Figs. 1 and 2, is connected with the frame 10 so as to support the latter, by means of springs 26 which are securely bolted to the axle and pivoted at one end to brackets 27 on the frame 10 and at the other end pivoted to links 28 which are also connected with brackets 29 on the frame, the links 28 forming the necessary flexible connection, between the springs and the frame, to accommodate the lengthening and shortening of the springs due to the flexing thereof.

The front axle, in the form of the invention shown in Figs. 1 and 2, is arranged for swinging movement to steer the vehicle. In this instance the springs 30 and 31 are connected with the axle 22 by means of vertical pivots 32 and 33 respectively, these pivots being preferably arranged on one side of the axle so as to reduce the swinging movement of the universal joint 25 to a minimum and also permit the use of very substantial pivots of the requisite length and diameter to be thoroughly reliable and durable in performing the service to which they are subjected. The springs 30 and 31 are shown as being of the semi-elliptic leaf type and are arranged in parallel relation adjacent the sides of the body 10 and the ends of the springs have sliding connection with the frame 10. These sliding conections comprise wear plates 34 secured to the under side of the frame 10, and shoes 35 on the ends of the springs. The opposite shoes 35 on the ends of the springs are pivotally connected by cross beams or levers, the beam 36 being arranged at the forward ends of the springs and being connected, at a point midway between the springs, with the body 10 by means of a vertical pivot 37. The rearward ends of the springs 30 and 31 are connected by the beams or links 38 which are also connected with a vertical pivot 39 on the vehicle body midway between the springs 30 and 31.

From Fig. 2 it will be seen that the springs 30 and 31 and the beams 36 and 38 constitute a parallelogram and the beams 36 and 38 will always hold the springs 30 and 31 in parallel relation to each other. The separate beams or levers 38, independently connected with the pivot 37, provide for independent flexing of the springs 30 and 31 to accommodate variations in the position of the load on the body and also any unevennesses in the road surface.

The springs 30 and 31 being connected with the axle 22 by the pivots 32 and 33, respectively, and the beams 36 and 38 being connected with the frame 10 by the pivots 37 and 39, it will be evident that the axle may be swung in either direction by swinging the beam 36, the springs 30 and 31 being also maintained in parallel relation. For the purpose of steering the vehicle there is shown the usual steering wheel 40 which is mounted on a post 41 and actuates a swinging arm 42 by any of the usual steering mechanisms. The arm 42 may be connected with the beam 36 by means of a link 43 and a pivot 44 so that the turning of the wheel 40 will affect the swinging of the beam 36.

Referring to Figs. 3, 4 and 5 it will be seen that the frame 45 is supported on two swinging axles 46 and 47. The axle 46 supports the frame 45 through springs 48 and 49, each of these springs being connected with the axle by a pivot 50 arranged on the side of the axle so that the plane of these pivots will be between the axis of the axle and the adjacent universal joint coupling 25. The frame 45 has wear plates 51 for the shoes 52 which are connected with the ends of the springs 48 and 49 and slide on the plates 51. The opposite shoes 52, between the planes of the axles 46 and 47, are connected together by a cross beam 53, this beam being pivoted to the shoes and also pivoted at 54 to the frame 45. The shoes 52 at the other end of the springs 48 and 49 are connected together and with a pivot 55, on the frame 45 by means of links or beams 56.

The axle 47 supports the frame 45 by mechanism similar to that just described so that a detail description thereof is unnecessary. The springs 57 and 58 are connected together and with the pivots 59 and 60 by means of the cross beams 61 and 62 respectively. The vertical pivots 63 between the springs 57 and 58 and the axle 47 are at the side of the axle 47 as in case of the pivots 50 so that the connections between the frame 45 and the axles are symmetrical. Any suitable form of steering mechanism, such as described in connection with Figs. 1 and 2 may be mounted on the frame 45 and connected with the beam 53 at the point 46. In order to effect the simultaneous swinging of both of the axles, the beams 53 and 61 are connected by means of the diagonally arranged crossed tension members 65 and 66 indicated diagrammatically in Fig. 4 and from this figure it will be apparent that the swinging of one of the axles will produce a swinging of the other axle through the same angle but in the opposite direction. It will be apparent that both of the axles may be swung in either direction and that by swinging both axles the turning radius of the vehicle is made much less than in the case of a single steering axle and by having all four wheels serve as driving wheels the tractive force of the vehicle is greatly increased and the vehicle rendered more serviceable for hauling purposes.

It will be evident that various changes may be made in the details of construction without departing from the spirit of my invention as defined in the claims and therefore I do not wish to be limited to the exact details shown and described.

Having thus described my invention, what I claim and desire to secure by Letters Patent is:

1. In a vehicle, the combination of a frame, an axle adapted to swing to steer the vehicle, supporting members between said axle and frame and pivotally connected with the former, cross links pivotally connected with said members and said frame, and means for swinging said axle.

2. In a vehicle, the combination of a frame, an axle adapted to swing to steer the vehicle, supporting springs pivotally connected with said axle and having a sliding connection with said frame, cross links pivotally connected with said springs and said frame, and means for swinging said axle.

3. In a vehicle, the combination of a frame, an axle adapted to swing to steer the vehicle, supporting members between said axle and frame and pivotally connected with the axle and having sliding connections at their opposite ends with said frame, cross links pivoted to the ends of said members and to said frame midway between said members, and means for swinging said axle.

4. In a vehicle, the combination of a frame, an axle adapted to swing to steer the vehicle, supporting springs having sliding connections at their ends with said frame, vertical pivots connecting said springs with said axle, cross links pivotally connected with said springs and said frame and means for swinging said axle.

5. In a vehicle, the combination of a frame, an axle adapted to swing to steer the vehicle, supporting members between said axle and frame and having sliding connections at their ends with the frame, vertical pivots connecting said members with said axle, cross links pivotally connected to the ends of said members and to said frame midway between said members, and means for swinging said axle.

6. In a vehicle, the combination of a frame, an axle adapted to swing to steer the vehicle, supporting springs between said axle and frame, vertical pivots connecting said springs with said axle and means for maintaining said springs in parallel relation to each other.

7. In a vehicle, the combination of a frame, an axle adapted to swing relatively to said frame, leaf springs arranged longitudinally of the vehicle and whereby the frame is supported on the axle, vertical pivots connecting said springs with said axle and means pivotally connected with the frame and adapted to maintain said springs in parallel relation to each other.

8. In a vehicle, the combination of a frame, an axle adapted to swing relatively to said frame, springs extending longitudinally of the vehicle and whereby said frame is supported on said axle, vertical pivots connecting said springs with said axle, vertical pivots on the under side of said frame midway between said springs, and links connected with the last mentioned pivots and with said springs whereby the springs are maintained in parallel relation to each other.

9. In a vehicle, the combination of a frame, an axle adapted to swing relatively to said frame, springs arranged longitudinally of the vehicle and whereby said frame is supported on said axle, vertical pivots connecting said springs with said axle, vertical pivots on said frame, a lever mounted on one of the last mentioned pivots and pivotally connected with said springs and links connecting the other of said last mentioned pivots with said springs.

10. In a vehicle, the combination of a frame, an axle adapted to swing relatively to said frame, springs arranged longitudinally of the vehicle at opposite sides thereof and whereby said frame is supported on said axle, vertical pivots connecting said springs with said axle, vertical pivots on said frame, a lever on one of the last mentioned pivots and pivotally connected with one end of each of said springs and links pivotally connecting the opposite ends of said springs with the other of said last mentioned pivots.

11. In a vehicle, the combination of a frame, a pair of axles, a pair of springs arranged longitudinally of the vehicle between each axle and the frame, vertical pivots connecting each spring with its axle, means connecting the ends of said springs with said frame and adapted to cause the springs to remain in parallel relation to each other when the axles are turned, and means connecting all of said springs together and adapted to cause said axles to be turned simultaneously in opposite directions.

12. In a vehicle, the combination of a frame, a pair of axles, pairs of springs arranged longitudinally of the vehicle and whereby the frame is supported on said axle, vertical pivots connecting said springs with said axles, vertical pivots on said frame and links connecting said springs with the last mentioned pivots and whereby the springs are maintained in parallel relation to each other when said axles are turned.

13. In a motor vehicle, the combination of a frame, an axle, supporting springs arranged longitudinally of the vehicle between said axle and said frame, a motor carried by said frame, a propeller shaft having universal joint connections with said axle and with the motor mechanism, vertical pivots between said springs and said axle, said pivots being arranged in a transverse plane between the center of the axle and the universal joint between the axle and the propeller shaft and means for maintaining said springs in parallel relation to each other.

14. In a vehicle, the combination of a frame, an axle, springs arranged longitudinally of the vehicle between said frame and said axle, said springs having a sliding connection at their ends with said frame, vertical pivots between said springs and said axle, vertical pivots on said frame midway between said springs, a lever arranged transversely of the vehicle and mounted on one of the said last named pivots and having its ends connected with one end of each of said springs, independently movable links connecting the other ends of said springs with the other of said last mentioned pivots, said lever and said links maintaining said springs in parallel relation and means for swinging said axle.

In testimony whereof I affix my signature.

ARTHUR M. LAYCOCK.

Copies of this patent may be obtained for five cents each, by addressing the "Commissioner of Patents, Washington, D. C."